US010237402B1

(12) United States Patent
Pan

(10) Patent No.: US 10,237,402 B1
(45) Date of Patent: Mar. 19, 2019

(54) MANAGEMENT OF COMMUNICATIONS BETWEEN DEVICES

(71) Applicant: Sorenson IP Holdings, LLC, Salt Lake City, UT (US)

(72) Inventor: Jasper Cheekong Pan, Draper, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 15/997,080

(22) Filed: Jun. 4, 2018

(51) Int. Cl.
*H04M 3/42* (2006.01)
*H04W 4/80* (2018.01)
*G10L 15/26* (2006.01)
*H04W 68/00* (2009.01)

(52) U.S. Cl.
CPC ....... *H04M 3/42391* (2013.01); *G10L 15/265* (2013.01); *H04M 3/42221* (2013.01); *H04W 4/80* (2018.02); *H04W 68/005* (2013.01); *H04M 2201/40* (2013.01)

(58) Field of Classification Search
CPC ... H04W 68/02; H04W 68/025; H04W 76/27; H04W 76/14; H04W 76/15; H04W 76/19; Y02D 70/24; Y02D 70/00; Y02D 70/1262; Y02D 70/1242; Y02D 70/126; Y02D 70/21; Y02D 70/1224; Y02D 70/146; Y02D 70/12
USPC ...... 455/458, 450, 435.1, 404.1, 418, 422.1, 455/452.1, 404.2, 432.1, 435.2, 456.1, 455/522
See application file for complete search history.

(56) References Cited

U.S. PATENT DOCUMENTS

| | | |
|---|---|---|
| 7,171,221 B1 | 1/2007 | Amin et al. |
| 7,729,489 B2 | 6/2010 | Lee et al. |
| 2002/0085516 A1 | 7/2002 | Bridgelall |
| 2004/0033815 A1 | 2/2004 | Noldus et al. |
| 2004/0235483 A1 | 11/2004 | Sylvain |
| 2005/0210516 A1 | 9/2005 | Pettinato |
| 2006/0072591 A1 | 4/2006 | Rogalski et al. |
| 2006/0121894 A1 | 6/2006 | Ganesan |
| 2006/0121916 A1 | 6/2006 | Aborn et al. |
| 2008/0026787 A1 | 1/2008 | Ibrahim et al. |

(Continued)

FOREIGN PATENT DOCUMENTS

JP 4805048 B2 11/2011

*Primary Examiner* — Fred A Casca
(74) *Attorney, Agent, or Firm* — Maschoff Brennan

(57) ABSTRACT

According to one or more aspects of the present disclosure, operations may include conducting, by a host device, first communication with a first device over a first network. The operations may further include conducting, by the host device based on the first communication, second communication with the first device over a second network when the first device is disconnected from the first network. The operations may also include obtaining, by the host device, a request for a communication session from a second device while the host device is conducting the second communication with the first device over the second network. In addition, the operations may include sending, by the host device, a request notification to the first device over the second network based on the host device conducting the second communication with the first device. The request notification may notify the first device of the request.

13 Claims, 5 Drawing Sheets

(56) References Cited

U.S. PATENT DOCUMENTS

| | | | |
|---|---|---|---|
| 2009/0111471 A1* | 4/2009 | Li | H04W 36/14 455/437 |
| 2010/0228546 A1 | 9/2010 | Dingier et al. | |
| 2012/0057565 A1 | 3/2012 | Mani | |
| 2013/0258997 A1 | 10/2013 | Chen | |
| 2014/0038594 A1* | 2/2014 | Lau | H04W 40/00 455/433 |
| 2015/0065133 A1* | 3/2015 | Cui | H04W 36/22 455/436 |
| 2015/0098464 A1 | 4/2015 | Cohen et al. | |
| 2015/0208353 A1* | 7/2015 | Jung | H04W 52/0254 455/456.6 |
| 2018/0034662 A1* | 2/2018 | Ku | H04L 12/46 |

\* cited by examiner

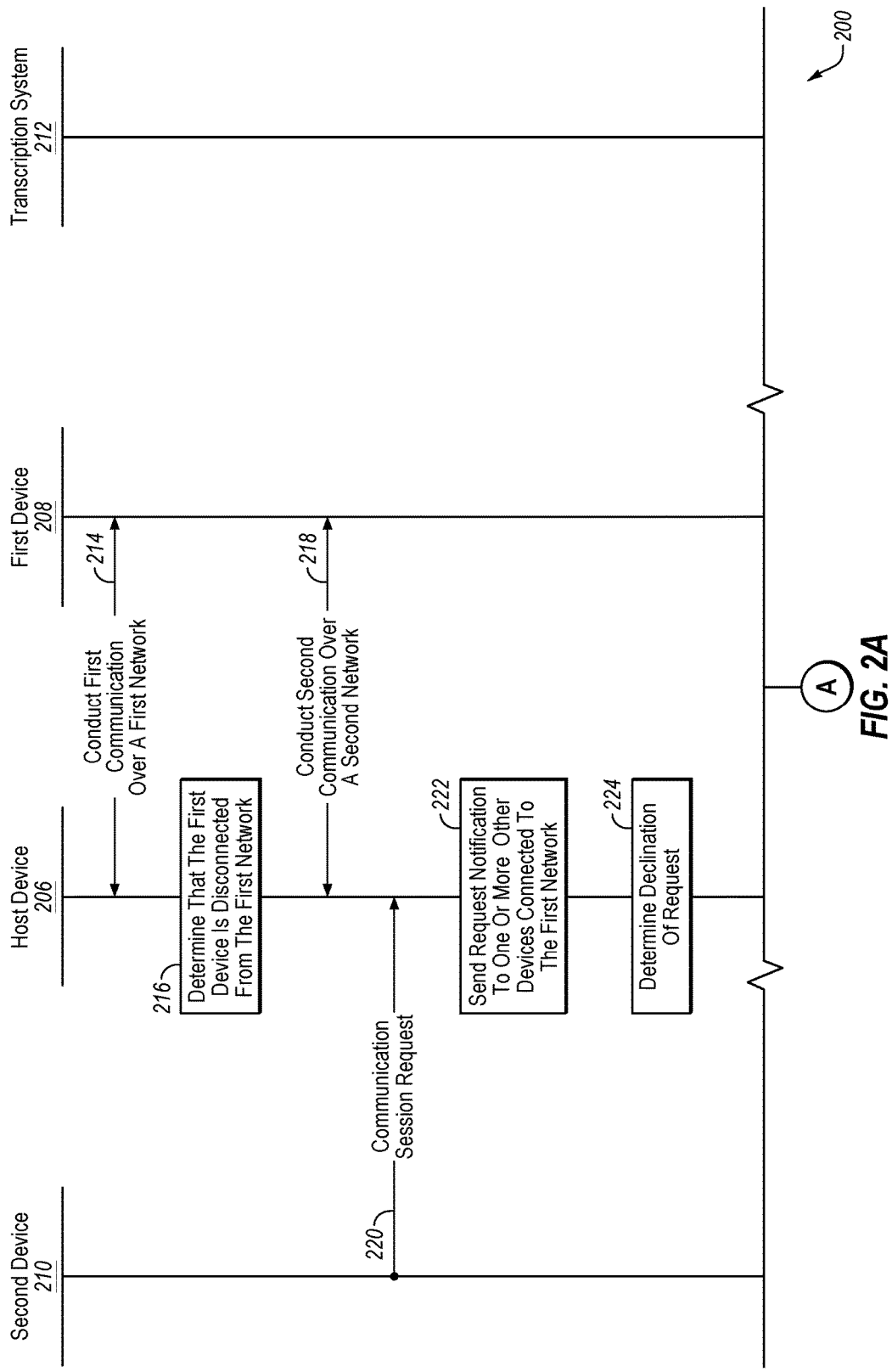

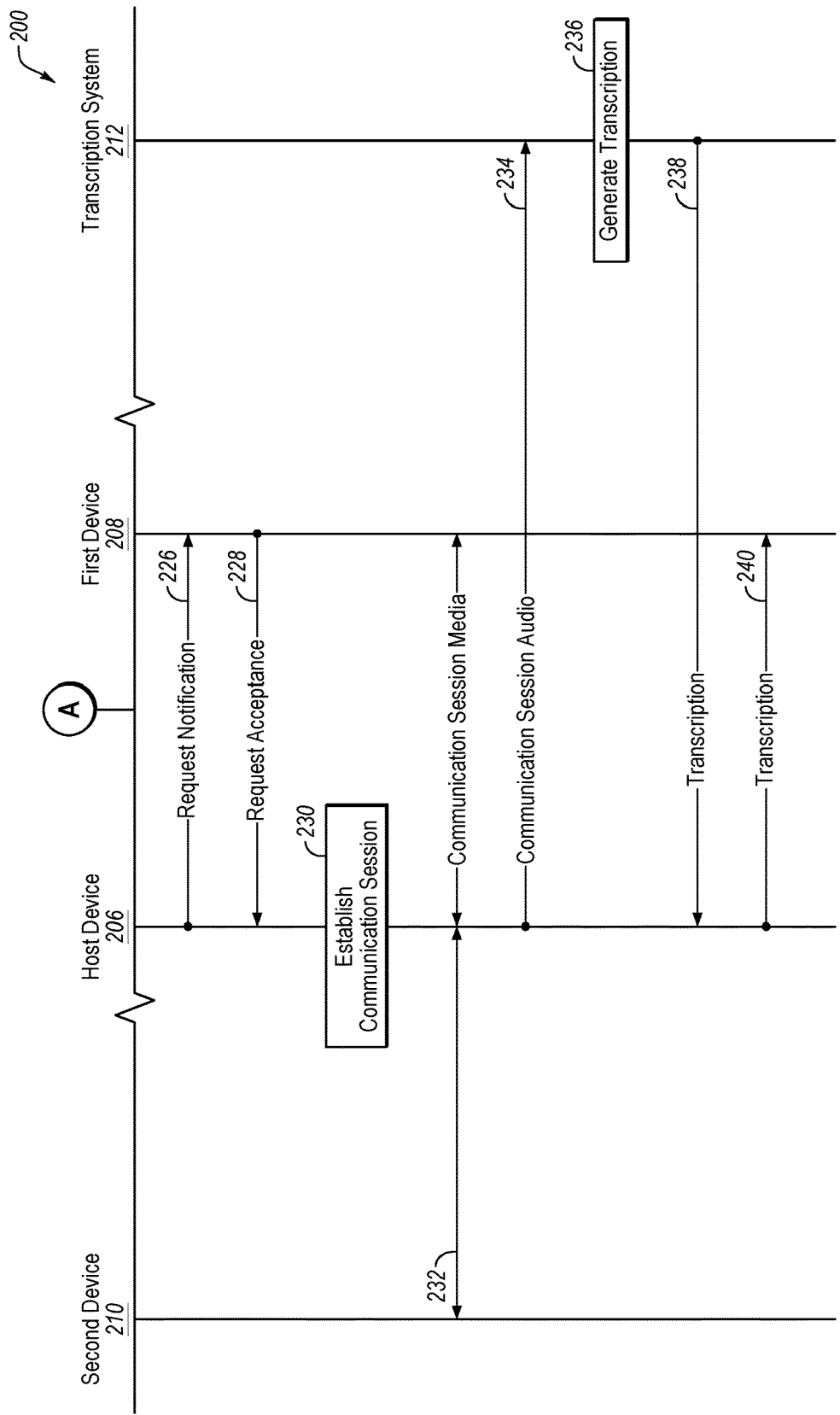

MANAGEMENT OF COMMUNICATIONS BETWEEN DEVICES

FIELD

The embodiments discussed in the present disclosure are related to management of communications between devices.

BACKGROUND

A person may have multiple devices that may be used by the person to interact with other persons. For example, the person may interact with another person via a communication session conducted with a home phone of the person. The person may also interact with another person via a communication session conducted with a cellular phone of the person.

Additionally, modern telecommunication services provide features to assist those who are deaf or hearing-impaired. One such feature is a system for the hearing impaired that obtains transcriptions of audio from communication sessions and that provides the transcription to a device participating in a corresponding communication session.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to managing communications between devices may be disclosed. In some embodiments, the operations may include conducting, by a host device, first communication with a first device over a first network in which the host device and the first device are both connected to the first network during the first communication and both conduct the first communication using first communication protocols of the first network. The operations may further include conducting, by the host device based on the first communication, second communication with the first device over a second network when the first device is disconnected from the first network. The operations may also include obtaining, by the host device, a request for a communication session from a second device while the host device is conducting the second communication with the first device over the second network. In addition, the operations may include sending, by the host device, a request notification to the first device over the second network based on the host device conducting the second communication with the first device. The request notification may notify the first device of the request.

BRIEF DESCRIPTION OF THE DRAWINGS

Example embodiments will be described and explained with additional specificity and detail through the use of the accompanying drawings in which:

FIGS. 2A and 2B illustrate example operations related to managing communications between devices;

DESCRIPTION OF EMBODIMENTS

Figure 1:
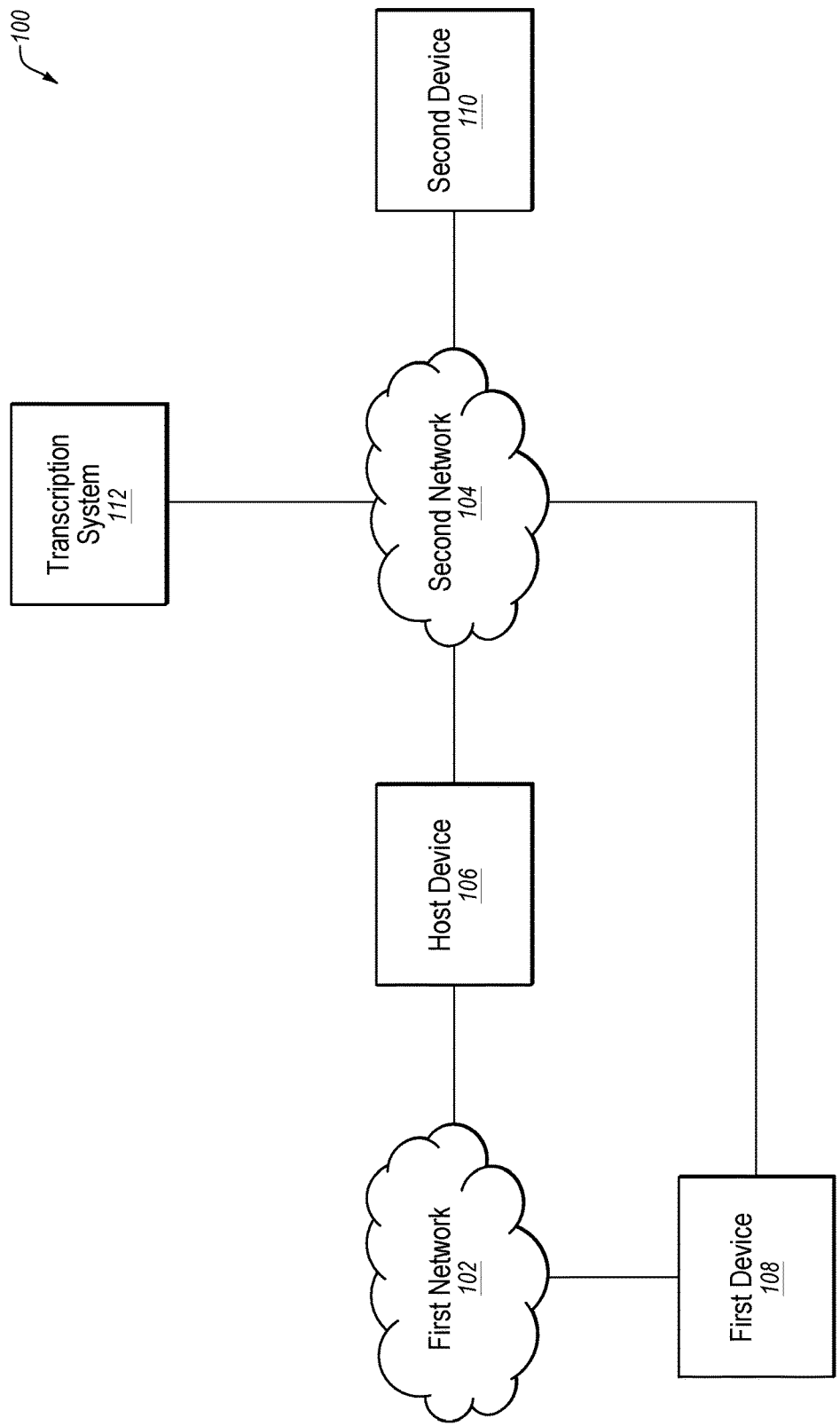
FIG. 1 illustrates an example environment related to managing communications between devices

Some embodiments in this disclosure relate to systems and methods that may be configured to manage communications between devices. For example, in some embodiments, the systems and/or methods may relate to a host device that may be configured to communicate with a first device associated with a first user over a first network and over a second network. The host device may also be configured to receive a request for a communication session ("communication session request") from a second device associated with a second user. The host device may be configured to send the first device a notification of the communication session request over the first network or over the second network based on the communication with the first device. Additionally or alternatively, the host device may be configured to manage the communication session in response to the first device accepting the communication session request. For example, the host device may be configured to receive first device media obtained by the first device in association with the communication session and to communicate the received first device media to the second device during the communication session. In these or other embodiments, the host device may be configured to receive second device media obtained by the second device in association with the communication session and to communicate the received second device media to the first device during the communication session.

Additionally or alternatively, in some embodiments, the host device may be configured to communicate first device audio of the first device media and/or second device audio of the second device media to a transcription system that may generate a transcription of the corresponding audio. In these or other embodiments, the host device may receive the transcription from the transcription system and communicate the transcription to the first device and/or the second device for presentation by the first device and/or the second device.

The systems and/or methods described in this disclosure may assist in conducting and establishing communication sessions by directing communication session requests to particular devices at particular times in which the particular devices at the particular times may better enable corresponding users to participate in communication sessions than if the communication session requests were directed otherwise. Additionally or alternatively, the systems and/or methods described in this disclosure may assist in enabling the generation and presentation of transcriptions of the communication sessions. Thus, the systems and/or methods provide at least a technical solution to a technical problem associated with the design of communication and/or transcription systems.

In the present disclosure reference to a communication session may refer to the exchanging of media (e.g., audio and/or video) between two or more devices in association with an interaction between persons. For example, in some embodiments, a communication session may be related to an audio communication (e.g., a telephone call) in which the communication session includes audio obtained and communicated between the devices being used to conduct the audio communication. As another example, in some embodiments, a communication session may be related to a video communication (e.g., a video call) in which the communication session includes audio and/or video obtained and communicated between the devices being used to conduct the video communication. In these or other embodiments, a communication session may include the exchanging of other data (e.g., data related to communication protocols) that may be related to the exchanging of media during the communication session.

As used in this disclosure, the term "audio" may be used generically to refer to sounds that may include spoken words. Furthermore, the term "audio" may be used generically to include audio in any format, such as a digital format, an analog format, or an acoustic wave format. In addition, in the digital format, the audio may be compressed using different types of compression schemes. Also, as used in this disclosure, the term "video" may be used generically to refer to a compilation of images that may be reproduced in a sequence to produce video. Furthermore, the term "video" may be used generically to include video in any format, such as a digital format, an analog format, or a visual presentation format. In addition, in the digital format, the video may be compressed using different types of compression schemes.

Turning to the figures, FIG. 1 illustrates an example environment 100 related to managing communication sessions between devices. The environment 100 may be arranged in accordance with at least one embodiment described in the present disclosure. The environment 100 may include a first network 102, a second network 104, a host device 106, a first device 108, a second device 110, and a transcription system 112.

In general the first network 102 and the second network 104 may be configured to communicatively couple systems and devices such as the host device 106, the first device 108, the second device 110, and the transcription system 112. In some embodiments, the first network 102 and the second network 104 may be connected to each other.

In some embodiments, the first network 102 may be configured as a short-range wireless network, such as a wireless local area network (WLAN), a personal area network (PAN), or a wireless mesh network (WMN). For example, the first network 102 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS. Communications may be performed over the first network 102 using first communication protocols that may correspond to the associated short-range wireless networks that may be included in the first network 102.

The second network 104 may generally be configured as a wide area network (WAN) that may extend over a relatively large geographical area as compared to the geographical area that may be covered by a short-range wireless network such as the first network 102. In some embodiments, the second network 104 may have numerous different configurations. In some embodiments, the second network 104 may include a peer-to-peer network. The second network 104 may also be coupled to or may include portions of a telecommunications network for sending data in a variety of different communication protocols. In some embodiments, the second network 104 may include an Internet Protocol (IP) based network such as the Internet. In some embodiments, the second network 104 may include cellular communication networks for sending and receiving communications and/or data including via hypertext transfer protocol (HTTP), direct data connection, wireless application protocol (WAP), etc. The second network 104 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. In these or other embodiments, the second network 104 may include any combination of analog, digital, and/or optical networks that form a public switched telephone network (PSTN) that may transport audio of a communication session. Communications may be performed over the second network 104 using second communication protocols that may correspond to the associated networks that may be included in the second network 104.

Each of the first device 108 and the second device 110 may be any electronic or digital computing device that may participate in a communication session. For example, the first device 108 or the second device 110 may include a desktop computer, a laptop computer, a smartphone, a mobile phone, a tablet computer, a telephone, a phone console, a caption device, a captioning telephone, or any other computing device that may be used for communication between devices.

In some embodiments, the first device 108 or the second device 110 may include memory and at least one processor, which may be configured to perform operations as described in this disclosure, among other operations. In some embodiments, the first device 108 or the second device 110 may include computer-readable instructions that are configured to be executed by the first device 108 or the second device 110 to perform operations described in this disclosure.

In some embodiments, each of the first device 108 and the second device 110 may be configured to participate in communication sessions with other devices. For example, each of the first device 108 and the second device 110 may be configured to establish an outgoing communication session with another device over a network such as the first network 102 and/or the second network 104. For example, in some embodiments, the first device 108 may be connected to the first network 102 and/or the second network 104 and may participate in a communication session with the second device 110 via the first network 102 and/or the second network 104. Additionally or alternatively, the second device 110 may be connected to the second network 104 and may participate in the communication session with the first device 108 via the second network 104.

In some embodiments, each of the first device 108 and the second device 110 may be configured to obtain media in association with a communication session. The media may include audio and/or video. The media may be part of an interaction (e.g., a video communication or an audio communication) that corresponds to the communication session.

For example, the first device 108 may be configured to obtain first media that may include first audio and/or first video. For instance, the first device 108 may obtain the first audio from a microphone of the first device 108 or from another device that is communicatively coupled to the first device 108. In some embodiments, the first audio may include speech of a first user participating in the interaction that corresponds to the communication session.

As an example of obtaining video, the first device 108 may be configured to obtain first video from a camera of the first device 108 or from another device communicatively coupled to the first device 108. In some embodiments, the first video may include video of the first user and/or of surroundings of the first user while the first user is participating in the interaction that corresponds to the communication session. The second device 110 may be similarly configured to obtain second media in association with the communication session in which the second media may include second audio and/or second video.

As indicated above and described in further detail below, the first device 108 and the second device 110 may be configured to participate in a communication session in which the media obtained by the first device 108 and the second device 110 in association with the communication session may be communicated between the first device 108 and the second device 110 during the communication session. For example, the first media obtained by the first device 108 may be communicated to the second device 110 and the second media obtained by the second device 110 may be communicated to the first device 108 during the communication session. As described in further detail below, in some embodiments, the host device 106 may be configured to manage the exchange of media between the first device 108 and the second device 110.

The host device 106 may be a digital device that is configured to manage communications over various networks between various types of devices. For example, in some embodiments, the host device 106 may be configured to establish, maintain, and/or terminate a communication session between the first device 108 and the second device 110. In these and other embodiments, the host device 106 may be configured to operate as an intermediary between the first device 108 and the second device 110. For example, the host device 106 may be configured to communicate with the first device 108 and the second device 110 during a communication session between the first device 108 and the second device 110. In these or other embodiments, the host device 106 may be configured to relay media associated with the communication session between the first device 108 and the second device 110 during the communication session. Additionally or alternatively, the host device 106 may be configured to communicate with the first device 108 using a first network type (e.g., the first network 102) and to communicate with the second device 110 using a second network type (e.g., the second network 104). The host device 106 may handle the communication protocols of the first and second network types such that the first device 108 is unaware of the protocols used for the second network type and the second device 110 is unaware of the protocols used for the first network type. In these and other embodiments, the first device 108 and the second device 110 may handle the communication session as if there were no changes in the network types or protocols. In some embodiments, the host device 106 may manage a communication session between the first device 108 and the second device 110 as described below with respect to FIGS. 2A and 2B.

In some embodiments, the host device 106 may be a dedicated device configured to managing communication sessions. Additionally or alternatively, the host device 106 may include another type of device configured to perform one or more operations other than those related to managing communication sessions. For example, the host device 106 may include a router, a desktop computer, a laptop computer, a smartphone, a mobile phone, a tablet computer, a telephone, a phone console, a caption device, a captioning telephone, or any other computing device that maybe configured to perform the operations described in the present disclosure with respect to the host device 106.

In some embodiments, the host device 106 and the first device 108 may both be associated with the first user. For example, the host device 106 may be associated with a number or other identifier (e.g., a telephone number, video call service username, etc.) that may be used in association with communication sessions. The number or other identifier associated with the host device 106 may also be associated with the first user. In addition, the first user device 108 may also be associated with a number or other identifier that may be associated with the first user. In some embodiments, the number or other identifier associated with the host device 106 may be the same as the number or other identifier associated with the first device 108. Additionally or alternatively, the number or other identifier associated with the host device 106 may be different from the number or other identifier associated with the first device 108.

Further, during some periods of time, the first device 108 and the host device 106 may both be connected to the first network 102. Additionally or alternatively, during other periods of time the first device 108 may be disconnected from the first network 102 (e.g., out of range of the first network 102). In these or other embodiment, the host device 106 may be connected to the first network 102 when the first device 108 is disconnected from the first network 102. In these or other embodiments, like the host device 106 and the first device 108, the first network 102 may be associated with the first user. For example, the first network 102 may be a short-range wireless network established at a location associated with the first user such as the first user's home.

Additionally or alternatively, in some embodiments, the host device 106 may be configured to direct communication session request notifications to the first device 108. For example, the host device 106 may receive a communication session request from the second device 110 and the host device 106 may be configured to communicate a corresponding communication session request notification to the first device 108. In some embodiments, the host device 106 may be configured to direct communication session request notifications to the first device 108 when the host device 106 and the first device 108 are both associated with the first user. In these or other embodiments, the host device 106 may be configured to direct the communication session requests to the first device 108 based on the host device 106 and the first device 108 both being associated with the first user.

In some embodiments, the host device 106 may be configured to direct the communication session request notifications to the first device 108 when the first device 108 is disconnected from the first network 102. In these and other embodiments, the host device 106 may direct the communication session request notifications to the first device 108 when the first device 108 is disconnected from the first network 102 based on communications performed between the host device 106 and the first device 108 over the first network 102.

For example, in some embodiments, the host device 106 and the first device 108 may conduct a first communication over the first network 102. The host device 106 and the first device 108 may conduct a second communication over the second network 104 when the first device 108 is disconnected from the first network 102. The second communication may be based on the first communication in some embodiments. In these or other embodiments, the host device 106 may communicate one or more communication request notifications to the first device 108 over the second network 104 based on the second communication. In some embodiments, the directing of the communication request notifications may be performed as explained in further detail below with respect to FIGS. 2A and 2B.

The transcription system 112 may be configured to generate a transcription of the audio of the communication session (referred to as "session audio"). In some embodiments, the transcription system 112 may be connected to the second network 104 and may obtain the session audio from the first device 108 and/or the second device 110 via the second network 104. Additionally or alternatively, the host device 106 may provide (e.g., via the second network 104) the session audio to the transcription system 112 as received from the first device 108 and/or the second device 110 as part of management of the communication session.

The transcription system 112 may be configured to recognize speech in the session audio. Based on the recognized speech, the transcription system 112 may generate and output a transcription of the speech. The transcription may be a written version of the speech in the session audio. In some embodiments, the transcription system 112 may obtain the transcription using a fully machine based automatic speech recognition (ASR) system.

Alternatively or additionally, the transcription system 112 may obtain the transcription using a re-voicing transcription system. Re-voicing transcription systems may receive and broadcast audio to a person who is a captioning agent. The captioning agent may listen to the broadcast and speak the words from the broadcast. The words spoken by the captioning agent are captured to generate re-voiced audio. The re-voiced audio may be used by a speech recognition program that is trained to the voice of the captioning agent to generate the transcription of the session audio.

The transcription system 112 may be configured to provide the generated transcription of the session audio to the first device 108 and/or the second device 110. Additionally or alternatively, the transcription system 112 may provide the transcription to the host device 106 and the host device 106 may provide the transcription to the first device 108 and/or the second device 110 as part of management of the communication session.

Modifications, additions, or omissions may be made to the environment 100 without departing from the scope of the present disclosure. For example, the environment 100 may include more or fewer elements than those described. For instance, the environment 100 may include other devices that may be associated with the first user, the second user, or one or more other users. Additionally, as indicated above, although illustrated as being connected to the first network 102 and the second network 104, the host device 106 and/or the first device 108 may be disconnected from the first network 102 and/or the second network 104 at various times. As such, the host device 106 and the first device 108 may not be connected to both the first network 102 and the second network 104 at all times.

FIGS. 2A and 2B illustrate example operations 200 to manage communications between devices. The operations 200 may be arranged in accordance with at least one embodiment described in the present disclosure. In the illustrated example, the operations 200 may be between a host device 206, a first device 208, a second device 210, and a transcription system 212. In some embodiments, the host device 206, the first device 208, the second device 210, and the transcription system 212 may be analogous to the host device 106, the first device 108, the second device 110, and the transcription system 112, respectively, of FIG. 1. Accordingly, no further explanation is provided with respect thereto. Alternatively or additionally, the operations 200 may be an example of the operation of the elements of the environment of FIG. 1.

In some embodiments, the operations 200 may be an example of communications and interactions between the host device 206, the first device 208, the second device 210, and the transcription system 212. In some embodiments, the interactions between the host device 206, the first device 208, the second device 210, and the transcription system 212 may occur over a first network (e.g., the first network 102 of FIG. 1) and/or over a second network (e.g., the second network 104). Generally, the operations 200 may relate to management of communication sessions between the first device 208 and the second device 210. The operations 200 illustrated are not exhaustive but are merely representative of operations 200 that may occur. Furthermore, one operation as illustrated may represent one or more communications, operations, and/or data exchanges.

At operation 214, the host device 206 may conduct a first communication with the first device 208. The host device 206 and the first device 208 may both be connected to a first network that may be a short-range wireless network such as the first network 102 of FIG. 1 at operation 214 in some embodiments. In these or other embodiments, the host device 206 and the first device 208 may both conduct the first communication over the first network using first communication protocols of the first network.

In some instances, the host device 206 and the first device 208 may both be connected to a second network such as the second network 104 of FIG. 1 during the operation 214. According to some embodiments, the host device 206 may conduct the first communication with the first device 208 over the first network even when the host device 206 and the first device 208 are both connected to the second network based on the first network being a short-range wireless type network and based on the second network being a wide area type network. Additionally or alternatively, the host device 206 may conduct the first communication with the first device 208 over the first network instead of the second network based on the host device 206, the first device 208, and the first network being associated with a same user (e.g., a first user). Additionally or alternatively, the first communication may not be part of a communication session that may be between the first device 208 and another device (e.g., the second device 210) and that may be managed by the host device 206

In some embodiments, the host device 206 and the first device 208 may be configured to exchange information during the first communication. The exchanged information may include information that may allow the host device 206 and the first device 208 to conduct a second communication over the second network. For example, the exchanged information may include addresses that may allow for identification of the host device 206 and the first device 208 in the second network. For instance, the information may include IP (Internet Protocol) addresses and/or MAC (Media Access Control) addresses that correspond to the host device 206 and the first device 208.

At operation 216, the host device 206 may determine that the first device 208 is disconnected from the first network. In some embodiments, the host device 206 may determine that the first device 208 is disconnected from the first network based on the first communication terminating. In these or other embodiments, the host device 206 may be configured to detect which other devices may be connected to the first network and may determine that the first device 208 is disconnected from the first network in response to not being able to detect that the first device 208 is connected to the first network.

At operation 218, the host device 206 may be configured to conduct a second communication with the first device 208. In these or other embodiments, the host device 206 may conduct the second communication with the first device 208 using the information exchanged during the first communication session. For instance, the host device 206 may conduct the second communication with the first device 208 over the second network using IP addresses and/or MAC addresses that may be obtained during the first communication.

In some embodiments, the host device 206 may conduct the second communication with the first device 208 when the first device 208 is disconnected from the first network. For example, in some embodiments, the host device 206 may be configured to conduct the second communication with the first device 208 in response to determining at operation 216 that the first device is disconnected from the first network. Additionally or alternatively, the host device 206 may conduct the second communication with the first device 208 to maintain communication with the first device 208 after the first device 208 has been disconnected from the first network. In some embodiments, the host device 206 may maintain communication with the first device 208 to enable the host device 206 to communicate communication session request notifications to the first device 208 or to enable the host device 206 to perform other operations with respect to managing communication sessions associated with the first device 208, such as described in further detail below. In the present disclosure, reference to "maintaining communication" may include performing operations in an ongoing basis that allow devices to communicate information between each other. The operations may be performed in a continuous, semi-continuous, or periodic manner.

In some embodiments, the host device 206 may conduct the second communication with the first device 208 over the second network using second communication protocols of the second network. In these and other embodiments, the host device 206 and the first device 208 may both be connected to the second network at operation 218. In these or other embodiments, the host device 206 and the first device 208 may both conduct the second communication over the second network using second communication protocols of the second network. Additionally or alternatively, the second communication may not be part of a communication session that may be between the first device 208 and another device (e.g., the second device 210) and that may be managed by the host device 206.

At operation 220, the second device 210 may communicate a communication session request that may be received by the host device 206. In some embodiments, the communication session request may include a number or other identifier associated with the host device 206. In these or other embodiments, the host device 206 may receive the communication session request based on the number or other identifier included in the communication session request being associated with the host device 206. Additionally or alternatively, the communication session request may include a number or other identifier associated with the first user. In these or other embodiments, the host device 206 may receive the communication session request based on both the host device 206 and the number or other identifier included in the communication session request being associated with the first user.

In some embodiments, the host device 206 may be configured to manage communications with respect to the received communication session request. For example, the host device may be configured to perform one or more of operations 222, 224, and 226 in response to receiving the communication session request.

At operation 222, the host device 206 may communicate a communication session request notification ("request notification") to one or more other devices that may be connected to the first network. In some embodiments, the operation 222 may occur when the first device 208 is disconnected from the first network. In some embodiments, the first network may be associated with a location associated with the first user (e.g., the first user's home) and the host device 206 may be configured to communicate the request notification to one or more devices connected to the first network before sending the request notification to another device not connected to the first network (e.g., to the first device 208), based on the first network being associated with a location associated with the first user.

At operation 224, the host device 206 may determine that the communication session request has been declined at the one or more other devices. In some embodiments, the host device 206 may determine that the communication session request has been declined in response to one or more other devices not responding to the request notification after a certain period of time. In these or other embodiments, the host device 206 may determine that the communication session has been declined in response to receiving an indication as such from the one or more other devices as a response to the request notification.

At operation 226, the host device 206 may communicate the request notification to the first device 208 over the second network. In some embodiments, the host device 206 may communicate the request notification in response to determining at operation 224 that the one or more other devices declined the communication session request. In these or other embodiments, the host device 206 may communicate the request notification to the first device 208 based on the first device 208 and the host device 206 both being associated with the first user.

Additionally or alternatively, the host device 206 may communicate the request notification to the first device 208 over the second network based on the host device 206 conducting the second communication with the first device 208 at operation 218. For example, based on the second communication, the host device 206 may have an open communication channel with the first device 208 such that the host device 206 may have the information to communicate the request notification to the first device 208.

At operation 228, the first device 208 may respond to the request notification with an acceptance of the communication session request. In response to the request acceptance received at operation 226, the host device 206 may perform operations related to managing communications between the first device 208 and the second device 210 in association with the communication session. For example, at operation 230, the host device 206 may perform operations to help establish the communication session between the first device 208 and the second device 210. For instance, the host device 206 may communicate an acceptance of the communication session request to the second device 210 to initiate the communication session.

As another example of managing the communications, at operation 232, the host device 206 may perform operations related to relaying media associated with the communication session ("communication session media") between the first device 208 and the second device 210. For example, in some embodiments, the host device 206 may receive first device media that may be obtained by the first device 208 in association with the communication session. The first device media may include first device audio and/or first device video associated with the communication session. For example the first device media may include audio and/or video of the first user. The host device 206 may communicate the first device media received from the first device 208 to the second device 210.

Additionally or alternatively, the host device 206 may receive second device media that may be obtained by the second device 210 in association with the communication session. The second device media may include second device audio and/or second device video associated with the communication session. For example the second device media may include audio and/or video of a second user of the second device. The host device 206 may communicate the second device media received from the second device 210 to the first device 208.

In some embodiments, the host device 206 may manage the communication session by managing protocols associated with the first device 208 and the second device 210 with respect to the communication of the communication session media. For example, in some embodiments, the first device 208 may be connected to a first sub-network of the second network that is of a first network type that utilizes first communication protocols with respect to the communication session. For instance, the first device 208 may be connected to an LTE network of the second network and may use VoLTE communication protocols with respect to the communication session. Additionally, the second device 210 may be connected to a second sub-network of the second network that is of a second network type that utilizes second communication protocols with respect to the communication session. For instance, the second device 210 may be connected to a PTSN network of the second network such that the second device 210 may use PTSN communication protocols with respect to the communication session.

In these or other embodiments, the host device 206 may be configured to handle both the first communication protocols (e.g., the VoLTE communication protocols) and the second communication protocols (e.g., the PTSN communication protocols) during the exchange of the first device media and the second device media. For example, the host device 206 may receive the first device media from the first device 208 based on the first communication protocols and may communicate the first device media to the second device 210 based on the second communication protocols. Similarly, in these or other embodiments, the host device 206 may receive the second device media from the second device 210 based on the second communication protocols and may communicate the second device media to the first device 208 based on the first communication protocols. As such, the first device 208 and the second device 210 may participate in the communication session as if there were no changes in network types or protocols.

As another example of managing the communications, the host device 206 may perform one or more operations related to obtaining and presenting a transcription of the communication session. For example, at operation 234, the host device 206 may communicate audio of the communication session ("communication session audio") to the transcription system 212. The communication session audio may include first device audio and/or second device audio associated with the communication session. In some embodiments, the host device 206 may communicate the communication session audio to the transcription system as a stream of audio in real-time as the communication session audio is received from the first device 208 and the second device 210.

At operation 236, the transcription system 212 may generate the transcription based on the received communication session audio. In some embodiments, the transcription system 212 may generate the transcription in real-time as the communication session audio is streamed to the transcription system 212.

At operation 238, the transcription system 212 may communicate the transcription to the host device 206. In some embodiments, the transcription system 212 may communicate the transcription as a stream in real-time as the transcription is being generated. At operation 240, the host device 206 may communicate the transcription to the first device 208 for presentation by the first device 208. Additionally or alternatively, the host device 206 may communicate the transcription to the second device 210 for presentation by the second device 210. In some embodiments, the host device 206 may communicate the transcription as a stream in real-time as the transcription is being received from the transcription system 212. In these and other embodiments, the streaming of the communication session audio, generation, streaming, and presentation of the transcription at operations 234, 236, 238, and 240 may be occurring in real-time with a delay. For example, the streaming of the communication session audio, generation, streaming, and presentation of the transcription may cause a delay of between one and fifteen seconds between presentation of particular second device audio at the first device 208 and presentation of a transcription of the particular second device audio at the first device 208.

Modifications, additions, or omissions may be made to the operations 200 without departing from the scope of the present disclosure. For example, the operations 200 may not include the operations 222 and/or 224 in some embodiments. In these or other embodiments, the host device 206 may proceed from operation 220 to operation 226 based on the determination at operation 216 that the first device 208 is disconnected from the first network. In these or other embodiments, one or more operations associated with the operation 230 may be omitted or performed by a device other than the host device 206. As another example, in some embodiments, the operations 200 may be arranged in a different order or performed at the same time. For example, the operations 232, 234, 236, 238, and 240 may be performed at the same time or in a different order than described. Further, the operations 232, 234, 236, 238, and 240 may be performed in an ongoing basis during the communication session.

In addition, one or more operations may be performed by different devices than as described. For example, in some embodiments, the first device 208 instead of the host device 206 may communicate the first device audio to the transcription system 212. In these or other embodiments, the second device 210 instead of the host device 206 may communicate the second device audio to the transcription system 212. Additionally or alternatively, the transcription system 212 may communicate the transcription to the first device 208 and/or the second device 210 instead of to the host device 206. As another example, in some embodiments, the first device 208 and the second device 210 may exchange the communication session media with each other without using the host device 206 as an intermediary in some embodiments.

Figure 3:
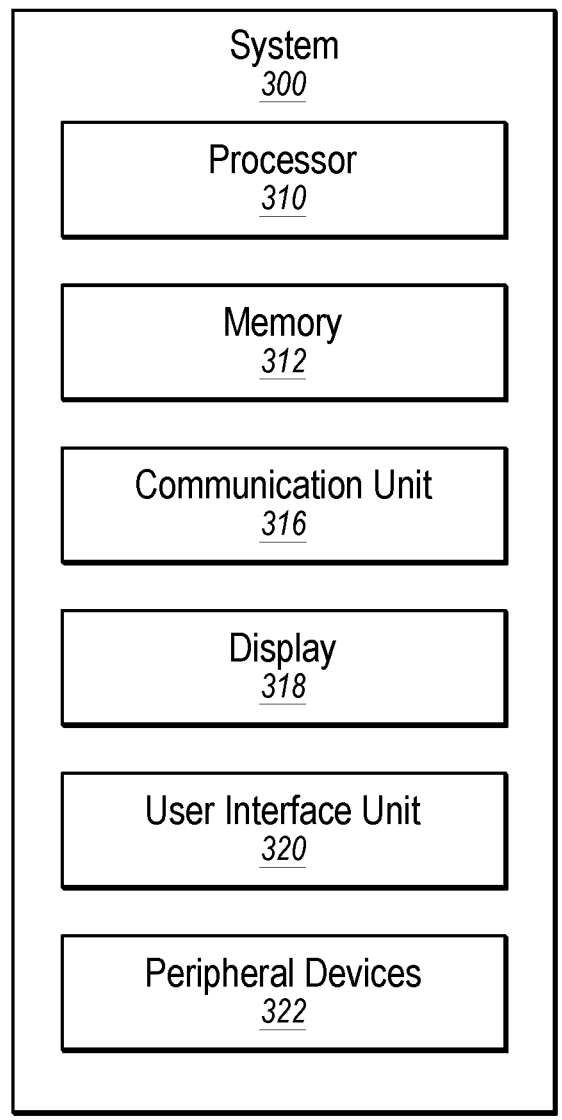
FIG. 3 illustrates an example system that may be used with respect to managing communications between devices.

FIG. 3 illustrates an example computing system 300 that may be used to manage communications. The system 300 may be arranged in accordance with at least one embodiment described in the present disclosure. The system 300 may include a processor 310, memory 312, a communication unit 316, a display 318, a user interface unit 320, and a peripheral device 322, which all may be communicatively coupled. In some embodiments, the system 300 may be part of any of the systems or devices described in this disclosure.

For example, the system 300 may be part of the host device 106 of FIG. 1 or the host device 106 of FIGS. 2A and 2B and may be configured to perform one or more of the operations described above with respect to the host devices. In another example, the system 300 may be part of the first device 108 of FIG. 1 or the first device 208 of FIGS. 2A and 2B and may be configured to perform one or more of the operations described above with respect to the first devices. As another example, the system 300 may be part of the second device 110 of FIG. 1 or the second device 210 of FIGS. 2A and 2B and may be configured to perform one or more of the operations described above with respect to the second devices. As another example, the system 300 may be part of the transcription system 112 of FIG. 1 or the transcription system 212 of FIGS. 2A and 2B and may be configured to perform one or more of the operations described above with respect to the transcription systems.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to managing communication sessions such that the system 300 may perform or direct the performance of the operations associated therewith as directed by the instructions. In these and other embodiments, instructions may be used to perform one or more operations of the operations 200 of FIGS. 2A and 2B or of the method 400 of FIG. 4.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 4007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 316 may permit data to be exchanged with a network and/or any other devices or systems described in the present disclosure. For example, when the system 300 is included in the host device 106 of FIG. 1, the communication unit 316 may allow the host device 106 to communicate with the first device 108 of FIG. 1.

The display 318 may be configured as one or more displays, like an LCD, LED, or other type of display. The display 318 may be configured to present video, text captions, user interfaces, and other data as directed by the processor 310. For example, when the system 300 is included in the first device 108 of FIG. 1 or the first device 208 of FIGS. 2A and 2B, the display 318 may be configured to present second device video obtained by the second device 110 or the second device 210, respectively, and/or a transcript of second device audio obtained by the second device 110 or the second device 210, respectively. As another example, For example, when the system 300 is included in the second device 110 of FIG. 1 or the second device 210 of FIGS. 2A and 2B, the display 318 may be configured to present first device video obtained by the first device 108 or the first device 208, respectively, and/or a transcript of second device audio obtained by the first device 108 or the first device 208, respectively.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described. For instance, the system 300 may not include one or more of: the display 318, the user interface unit 320, and peripheral device 322.

Figure 4:
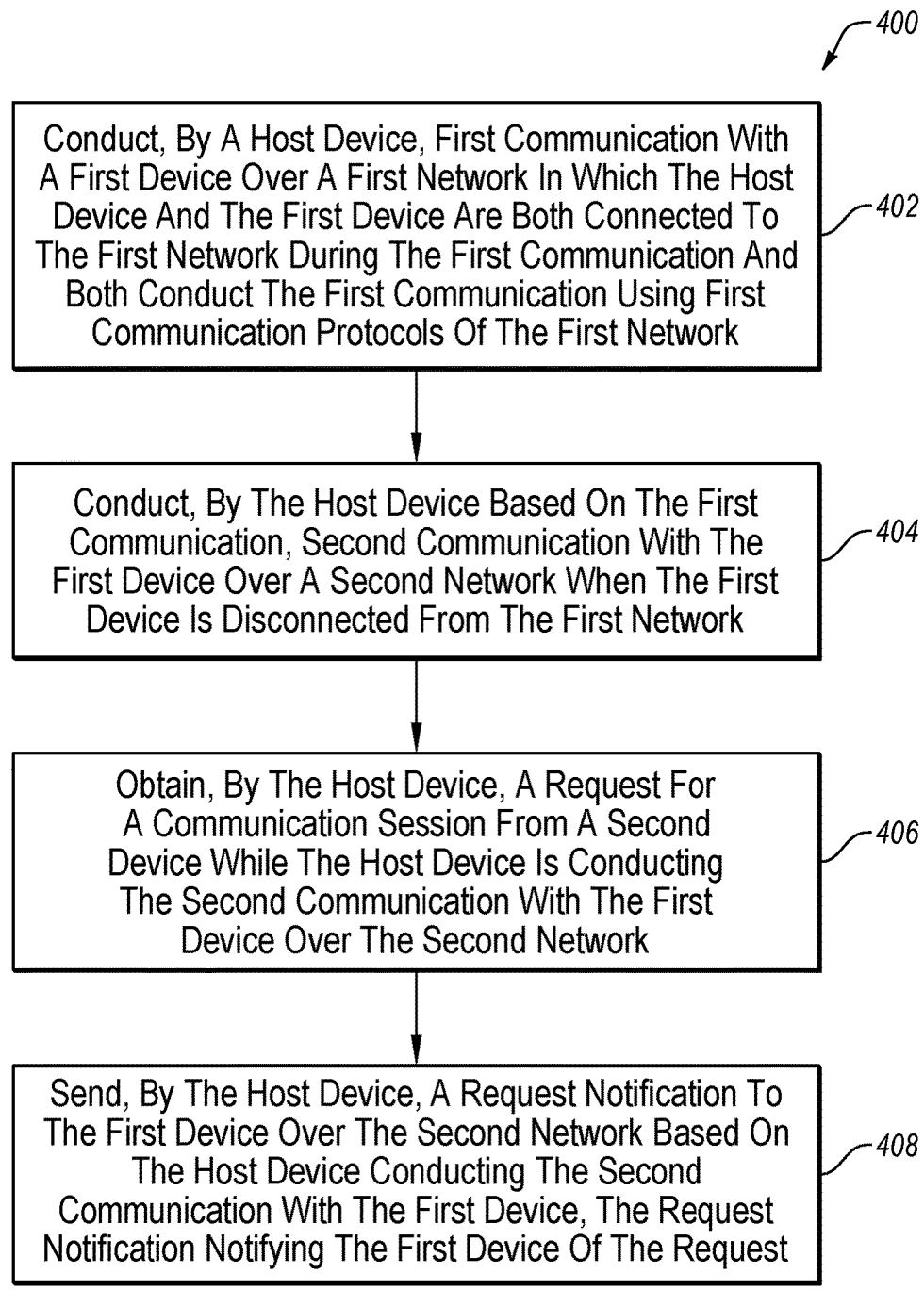
FIG. 4 is a flowchart of an example method to manage communications between devices, all arranged according to one or more embodiments described in the present disclosure.

FIG. 4 is a flowchart of an example method 400 to manage communications between devices. The method 400 may be arranged in accordance with at least one embodiment described in the present disclosure. One or more of the operations of the method 400 may be performed, in some embodiments, by a device or system, such as the host device 106 of FIG. 1, the host device 206 of FIGS. 2A and 2B, or the system 300 of FIG. 3, or another device or system. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a host device may conduct a first communication with a first device (e.g., the first device 108 of FIG. 1 or the first device 208 of FIGS. 2A and 2B) over a first network. In some embodiments, the first network may be a short-range wireless network such as the first network 102 of FIG. 1. Additionally or alternatively, the host device and the first device may be connected to the first network during the first communication and may both conduct the first communication using first communication protocols of the first network. By way of example, one or more operations of the operation 214 of FIGS. 2A and 2B may be performed at block 402 in some embodiments.

At block 404, the host device may conduct a second communication with the first device over a second network. In some embodiments, the second network may be a wide area network such as the second network 104 of FIG. 1. Additionally or alternatively, the host device and the first device may conduct the second communication when the first device is disconnected from the first network. In these or other embodiments, the host device and the first device may conduct the second communication based on the first communication. For example, the host device and the first device may conduct the second communication based on information exchanged between the host device and the first device during the first communication. By way of example, one or more operations of the operation 218 of FIGS. 2A and 2B may be performed at block 404 in some embodiments.

At block 406, the host device may obtain a request for a communication session from a second device (e.g., the second device 110 of FIG. 1 or the second device 210 of FIGS. 2A and 2B) while the host device is conducting the second communication with the first device over the second network. By way of example, one or more operations of the operation 220 of FIGS. 2A and 2B may be performed at block 406 in some embodiments.

At block 408, the host device may send a request notification to the first device over the second network based on the host device conducting the second communication with the first device. The request notification may notify the first device of the request for the communication session that may be obtained at block 406 by the host device. By way of example, one or more operations of the operation 226 of FIGS. 2A and 2B may be performed at block 408 in some embodiments. In some embodiments, the host device may send the request notification to the first device in response to the host device and the first device both being associated with a same user such as described above with respect to the operation 226 of FIGS. 2A and 2B.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include operations related to receiving, at the host device, first device media obtained by the first device in association with the communication session and communicating, by the host device, the first device media to the second device during the communication session, such as described above with respect to operation 232 of operations 200 of FIGS. 2A and 2B. Additionally or alternatively, the method 400 may further include operations related to receiving, at the host device, second device media obtained by the second device in association with the communication session and communicating, by the host device, the second device media to the first device during the communication session, such as described above with respect to operation 232 of operations 200 of FIGS. 2A and 2B. In these or other embodiments, the method 400 may include one or more operations related to the operation 230 of FIGS. 2A and 2B, which is related to establishing the communication session.

In these or other embodiments, the method 400 may include one or more operations related to sending, by the host device, the request notification over the first network to a third device connected to the first network prior to sending the request notification to the first device over the second network and sending the request notification to the first device in response to determining a declination of the request by the third device, such as described above with respect to operations 222, 224, and 226 of FIGS. 2A and 2B.

In these or other embodiments, the method 400 may include one or more operations related to obtaining a transcription of first device audio obtained by the first device and/or second device audio obtained by the second device in association with the communication session. Additionally or alternatively, the method 400 may include one or more operations related to communicating the transcription to the first device and/or the second device. One or more of the transcription related operations may be performed such as described above with respect to operations 234, 236, 238, and 240 of FIGS. 2A and 2B.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of managing communications, the method comprising:

conducting, by a host device, first communication with a first device over a short-range wireless network in which the host device and the first device are both connected to the short-range wireless network during the first communication and both conduct the first communication using first communication protocols of the short-range wireless network;

conducting, by the host device based on information exchanged between the host device and the first device during the first communication, second communication with the first device over a wide area network when the first device is disconnected from the short-range wireless network;

obtaining, by the host device, a request for a communication session from a second device while the host device is conducting the second communication with the first device over the wide area network;

sending, by the host device, a request notification to the first device over the wide area network based on the host device conducting the second communication with the first device, the request notification notifying the first device of the request for the communication session; and in response to receiving an acceptance of the request for the communication session from the first device as a response to the request notification:

receiving, at the host device, first device media obtained by the first device in association with the communication session; and communicating, by the host device, the first device media to the second device during the communication session.

2. The method of claim 1, further comprising:
obtaining a transcription of second device audio obtained by the second device in association with the communication session; and
communicating the transcription to the first device.

3. The method of claim 1, further comprising:
receiving, at the host device, second device media obtained by the second device in association with the communication session; and
communicating, by the host device, the second device media to the first device during the communication session.

4. The method of claim 1, further comprising sending the request notification to the first device in response to the host device and the first device both being associated with a same user.

5. The method of claim 1, further comprising:
sending, by the host device, the request notification over the short-range wireless network to a third device connected to the short-range wireless network prior to sending the request notification to the first device over the wide area network; and
sending the request notification to the first device in response to determining a declination of the request for the communication session by the third device.

6. At least one non-transitory computer-readable media configured to store one or more instructions that in response to being executed by at least one computing system cause performance of operations, the operations comprising:
conducting, by a host device, first communication with a first device over a short-range wireless network in which the host device and the first device are both connected to the short-range wireless network during the first communication and both conduct the first communication using first communication protocols of the short-range wireless network;
conducting, by the host device based on information exchanged between the host device and the first device during the first communication, second communication with the first device over a wide area network when the first device is disconnected from the short-range wireless network;
obtaining, by the host device, a request for a communication session from a second device while the host device is conducting the second communication with the first device over the wide area network;
sending, by the host device, a request notification to the first device over the wide area network based on the host device conducting the second communication with the first device, the request notification notifying the first device of the request for the communication session;
in response to receiving an acceptance of the request for the communication session from the first device as a response to the request notification:
receiving, at the host device, first device media obtained by the first device in association with the communication session; and
communicating, by the host device, the first device media to the second device during the communication session.

7. The computer-readable media of claim 6, wherein the operations further comprise:
obtaining a transcription of second device audio obtained by the second device in association with the communication session; and
communicating the transcription to the first device.

8. The computer-readable media of claim 6, wherein the operations further comprise sending the request notification to the first device in response to the host device and the first device both being associated with a same user.

9. The computer-readable media of claim 6, wherein the operations further comprise:
sending, by the host device, the request notification over the short-range wireless network to a third device connected to the short-range wireless network prior to sending the request notification to the first device over the wide area network; and
sending the request notification to the first device in response to determining a declination of the request for the communication session by the third device.

10. A system comprising:
one or more processors; and
one or more computer-readable media configured to store instructions that, in response to being executed by the one or more processors, cause the system to perform operations, the operations comprising:
conducting first communication with a first device over a short-range wireless network in which the system and the first device are both connected to the short-range wireless network during the first communication and both conduct the first communication using first communication protocols of the short-range wireless network;
conducting, based on information exchanged with the first device during the first communication, second communication with the first device over a wide area network when the first device is disconnected from the short-range wireless network;
obtaining a request for a communication session from a second device while the system is conducting the second communication with the first device over the wide area network;
sending a request notification to the first device over the wide area network based on the system conducting the second communication with the first device, the request notification notifying the first device of the request for the communication session;
in response to receiving an acceptance of the request for the communication session from the first device as a response to the request notification:
receiving first device media obtained by the first device in association with the communication session; and
communicating the first device media to the second device during the communication session.

11. The system of claim 10, wherein the operations further comprise:
obtaining a transcription of second device audio obtained by the second device in association with the communication session; and
communicating the transcription to the first device.

12. The system of claim 10, wherein the operations further comprise sending the request notification to the first device in response to the system and the first device both being associated with a same user.

13. The system of claim 10, wherein the operations further comprise:
sending the request notification over the short-range wireless network to a third device connected to the short-range wireless network prior to sending the request notification to the first device over the wide area network; and sending the request notification to the first device in response to determining a declination of the request for the communication session by the third device.

* * * * *